Patented Mar. 30, 1937

2,075,430

UNITED STATES PATENT OFFICE 2,075,430

MANUFACTURE OR TREATMENT OF ARTIFICIAL MATERIALS

Henry Dreyfus, London, England

No Drawing. Application February 4, 1936, Serial No. 62,330. In Great Britain March 7, 1935

13 Claims. (Cl. 18—54)

This invention relates to improvements in the production and treatment of artificial materials and particularly to improvements in processes wherein artificial filaments, threads, yarns, foils and similar materials are formed by wet spinning processes and/or are stretched. This invention is a continuation-in-part of the invention disclosed in application S. No. 638,179 filed October 17, 1932.

Processes have hitherto been described wherein artificial filaments, threads, yarns, ribbons, foils and similar materials having a basis of organic derivatives of cellulose are produced by the extrusion of solutions of organic derivatives of cellulose into coagulating media comprising mixtures of solvents or other swelling agents and non-solvents for the cellulose derivatives. Processes have also been described wherein artificial filaments, threads, yarns, ribbons, foils and similar materials having a basis of organic derivatives of cellulose are softened by mixtures of solvents or other swelling agents and non-solvents for the cellulose derivatives and are stretched while in the softened condition.

It has now been discovered that improved results may be obtained in such processes by applying to the materials an acid salt which decreases the solubility of the solvent or other swelling agent in the non-solvent. The term "acid salt" is employed in the present specification to mean a salt which has an acid reaction in solution, and does not necessarily mean a polybasic acid salt which still contains replaceable hydrogen.

According to the present invention, therefore, in processes wherein artificial filaments, threads, yarns, ribbons, foils and similar materials having a basis of organic derivatives of cellulose are treated with mixtures of solvents or other swelling agents and non-solvents for the cellulose derivatives, there are applied to such materials in the presence of such mixtures acid salts which are adapted to decrease the solubility of the solvents or other swelling agents in the non-solvents. It has been found that the presence of acid salts causes more rapid or greater softening of the materials. The term "swelling agent" for the cellulose derivative as used hereinafter is to be understood as including both true solvents and also agents which exert only a swelling action. The invention is of particular importance where the mixture of swelling agent and non-solvent with which the materials are treated is an aqueous solution of an organic swelling agent for the cellulose derivative.

The acid salts employed according to this invention are preferably highly soluble in the non-solvent constituent of the medium and substantially insoluble in the swelling agent constituent of the medium. The salts may be salts of either organic or inorganic acids and among suitable salts which may be employed may be mentioned the ammonium, sodium and potassium dihydrogen phosphates, bisulphates and bisulphites which are acidic in reaction; the chlorides of zinc and magnesium, acid sodium and potassium acetates and other acid salts of alkali metals or ammonia with like fatty acids, and acid salts of polybasic organic acids, e. g. sodium and potassium hydrogen tartrates and acid sodium and potassium citrates and oxalates.

The invention may be carried into effect in a number of ways. Thus a solution of an organic derivative of cellulose in a neutral organic solvent may be extruded into a coagulating medium consisting of a strong solution, preferably aqueous, of a swelling agent for the cellulose derivative which contains an acid salt or again a solution of an organic derivative of cellulose in a neutral organic medium containing a swelling agent for the cellulose derivative of higher boiling point than the non-solvent of the coagulating medium may be extruded into a coagulating medium consisting of a solution of a swelling agent in water or other non-solvent containing an acid salt. By employing a swelling agent in the coagulating medium which is less volatile than the non-solvent constituent of the coagulating medium products of high lustre may be obtained. The concentration of swelling agent in the coagulating medium will vary with the conditions of spinning. When spinning acetone solutions of cellulose acetate highly satisfactory results may, in general, be obtained with aqueous coagulating media consisting of 25 to 65%, and particularly 45 to 55% solutions of such solvents as diacetone alcohol, diethyl tartrate and ethyl lactate. The acid salt may be employed in any suitable concentration provided that it does not cause actual separation of the swelling agent from the non-solvent. In general, proportions of 1 to 10% are satisfactory, e. g. 3, 5 or 8%.

Artificial filaments and other products produced by wet spinning processes may also be brought to a highly softened condition subsequent to but continuously with coagulation by treatment with media containing swelling agents and acid salts, and stretched while in such softened condition.

One of the principal advantages of the use of acid salts according to the present invention is that materials produced by wet spinning processes may be stretched continuously with their production very rapidly and to a high degree, e. g. to 500 or 1,000% or more of the length which they would have if no stretch were applied.

As indicated above the present invention is also of very great value in processes for stretching formed artificial filaments, threads, yarns, ribbons, foils and similar materials containing organic derivatives of cellulose, wherein the materials are treated with mixtures of swelling agents and non-solvents in order to soften them prior to stretching. The acid salts may be incorporated in the mixtures of swelling agents and non-solvents applied to the materials or the salts may be applied to the materials separately while they are carrying the mixture of swelling agent and non-solvent. Where the salt is applied separately it is preferable to apply it in solution in a non-solvent medium, the non-solvent being the same as that present in the medium on the materials. Preferably the swelling agent constituent of the medium employed to soften the materials is less volatile than the non-solvent constituent.

The stretching operation may be carried out in any suitable manner, for example, the materials may be stretched by means of positively driven rollers or the like. Filaments, yarns, and like materials may be treated in the form of hanks, but it is preferable to treat the materials while they are travelling from one point to another, e. g. from bobbin to bobbin, from a spinning machine to the winding apparatus, or as a warp proceeding from beam to beam. The stretching operation may be carried out in a single stage, but is preferably effected in a number of stages, with or without intermediate stages in which the materials are released from the stretching tension. The concentration of the swelling agent in the softening medium applied to the materials may vary in accordance with the degree of softening which is required, and the nature of the agent employed. However, in general, concentrations of 25 to 65%, and particularly of 45 to 55%, of swelling agent are satisfactory. The quantity of the salt applied to the materials may vary but should not be so great as to cause actual separation of the solvent and non-solvent. In general, proportions of 1 to 5, 8 or 10% of the weight of the solvent/non-solvent mixture present are satisfactory.

The invention is broadly applicable to the treatment of materials to which there are applied mixtures of swelling agents and non-solvents. Any suitable swelling agents and non-solvents may be employed. Thus, for example, suitable solvents are acetone, diacetone alcohol, ethyl lactate, diethyl tartrate, dioxane or esters and ether esters of olefine glycols, e. g. glycol mono-acetate and methyl glycol mono-acetate and other neutral solvents. Whilst, as indicated above, it is preferable that the non-solvent should be water, other non-solvents may be employed if desired, e. g. ethers, alcohols and hydrocarbons.

The process of the present invention may be effected at normal temperatures and pressures or at super-atmospheric temperatures and/or pressures, e. g. temperatures of 40 to 60° C. or more, and pressures of 10 to 30 pounds per square inch or more above atmospheric pressure. Stretching may be effected to only a low degree, e .g. to 150 or 200% of the original length of the materials, or to considerably higher degrees, e. g. to 400 or 600% or more of the original length of the materials.

The lustre of the materials produced according to this invention may be varied, for example by varying the concentration or nature of the swelling agent employed in the coagulating bath or in the medium applied to soften the materials, the lustre of the products varying, according to the conditions, from very high lustre to matt or non-lustrous. The concentration of the acid salt employed also affects the lustre of the products, the lustre, in general, increasing with the concentration of the salt. It is found that products having a low lustre produced according to this invention are not relustred by treatments with salts or solvents such as are described in U. S. Patents Nos. 1,808,098 and 1,774,184.

The following examples illustrate the invention but are not to be considered as limiting it in any way:—

*Example I*

A 25% solution of cellulose acetate in acetone is spun through orifices of 0.08 mm. diameter into a coagulating bath consisting of 45 parts by weight of diacetone alcohol, 8 parts by weight of sodium bisulphate and 47 parts by weight of water. The filaments are withdrawn from the bath at a speed of 60 to 70 metres per minute, the supply of solution to the spinning orifices being so adjusted that at the drawing speed the products are stretched to 7 or 8 times the length which they would have possessed had they not been stretched. After washing with water the filaments are wound on bobbins or collected in a centrifugal spinning box.

*Example II*

Cellulose acetate yarns are withdrawn from a creel of bobbins and passed in warp formation, i. e. as a sheet of yarns in substantially parallel formation, through a bath consisting of 50 parts by weight of dioxane, 47½ parts by weight of water and 2½ parts by weight of acid sodium acetate, and are stretched whilst in such bath, by means of a device extending across the entire sheet to 2, 4 or more times their original length. On emerging from the bath the yarns are washed, dried and again wound on to bobbins.

Whilst the invention is particularly valuable in the production and treatment of artificial filaments and similar materials having a basis of cellulose acetate, and has been described above with special reference thereto, it may also be directed to the production and treatment of artificial materials having a basis of any other organic derivative of cellulose, e. g. cellulose formate, propionate, butyrate, nitroacetate and other esters or mixed esters of cellulose, methyl, ethyl and butyl celluloses and other cellulose ethers, mixed ethers and mixed ether esters, for example ethyl cellulose acetate and oxyethyl cellulose acetate.

Having described my invention what I desire to secure by Letters Patent is:—

1. In processes wherein artificial filaments, threads, yarns, ribbons, foils and similar materials having a basis of an organic derivative of cellulose are treated with a mixture of a swelling agent and a non-solvent for the cellulose derivative, the step of subjecting the materials in the presence of said mixture to treatment with a polybasic acid salt which contains replaceable hydrogen, which has an acid reaction in solution and which is adapted to decrease the solubility of the said swelling agent in the said non-solvent.

2. Process for the manufacture of artificial filaments, threads, yarns, ribbons, and similar materials, which comprises extruding a solution of an organic derivative of cellulose through a suitable shaping device into a coagulating medium containing a swelling agent and a non-solvent for the cellulose derivative and treating the extruded materials with a polybasic acid salt which contains replaceable hydrogen, which has an acid reaction, and which decreases the solubility of the said swelling agent in the said non-solvent.

3. Process for the treatment of artificial filaments, threads, yarns, ribbons, and similar materials having a basis of an organic derivative of cellulose, which comprises softening such materials by treating them with a mixture of a swelling agent and a non-solvent for the cellulose derivative and with a polybasic acid salt which contains replaceable hydrogen, which has an acid reaction, and which decreases the solubility of the said swelling agent in the said non-solvent, and subjecting the softened materials to a stretching operation.

4. Process for the manufacture of artificial filaments, threads, yarns, ribbons, and similar materials, which comprises extruding a solution of an organic derivative of cellulose in a neutral organic solvent medium through a suitable shaping device into a coagulating medium containing a non-solvent for the cellulose derivative, a less volatile neutral organic swelling agent therefor in a concentration of 25-65% and a polybasic acid salt which contains replaceable hydrogen, which has an acid reaction, and which decreases the solubility of the said swelling agent in the said non-solvent, and stretching the products.

5. Process for the treatment of artificial filaments, threads, yarns, ribbons, and similar materials having a basis of an organic derivative of cellulose, which comprises softening such materials by treating them with a mixture of a non-solvent for the cellulose derivative, a neutral organic solvent therefor in a concentration of 25-65% and a polybasic acid salt which contains replaceable hydrogen, which has an acid reaction, and which decreases the solubility of the said solvent in the said non-solvent, and subjecting the softened materials to a stretching operation.

6. Process for the manufacture of artificial filaments, threads, yarns, ribbons, and similar materials, which comprises extruding a solution of an organic derivative of cellulose in a neutral organic solvent medium through a suitable shaping device into an aqueous coagulating medium containing a neutral organic solvent for the cellulose derivative, which is less volatile than water, in a concentration of 25-65% and 1-10% of a polybasic acid salt which contains replaceable hydrogen, which has an acid reaction, and which decreases the solubility of the said solvent in water, and stretching the products.

7. Process for the treatment of artificial filaments, threads, yarns, ribbons, and similar materials having a basis of an organic derivative of cellulose, which comprises softening such materials by treating them with an aqueous solution of a neutral organic solvent for the cellulose derivative in a concentration of 25-65% containing 1-10% of a polybasic acid salt which contains replaceable hydrogen, which has an acid reaction, and which decreases the solubility of the said solvent in water and subjecting the softened materials to a stretching operation.

8. Process for the manufacture of artificial filaments, threads, yarns, ribbons, and similar materials, which comprises extruding a solution of cellulose acetate in acetone through a suitable shaping device into an aqueous coagulating medium containing 45-55% of a neutral organic solvent for the cellulose acetate which is less volatile than water and 1-10% of an acid salt selected from the group consisting of the di-hydrogen phosphates of sodium, potassium and ammonia, and stretching the products.

9. Process for the treatment of artificial filaments, threads, yarns, ribbons, and similar materials having a basis of cellulose acetate, which comprises softening such materials by treating them with an aqueous solution containing 45-55% of a neutral organic solvent for the cellulose acetate and 1-10% of an acid salt selected from the group consisting of the di-hydrogen phosphates of sodium, potassium and ammonia, and subjecting the softened materials to a stretching operation.

10. Process for the manufacture of artificial filaments, threads, yarns, ribbons, and similar materials, which comprises extruding a solution of cellulose acetate in acetone through a suitable shaping device into an aqueous coagulating medium containing 45-55% of a neutral organic solvent for the cellulose acetate which is less volatile than water and 1-10% of an acid salt selected from the group consisting of the bisulphites of sodium, potassium and ammonia, and stretching the products.

11. Process for the treatment of artificial filaments, threads, yarns, ribbons, and similar materials having a basis of cellulose acetate, which comprises softening such materials by treating them with an aqueous solution containing 45-55% of a neutral organic solvent for the cellulose acetate and 1-10% of an acid salt selected from the group consisting of the bisulphites of sodium, potassium and ammonia, and subjecting the softened materials to a stretching operation.

12. Process for the manufacture of artificial filaments, threads, yarns, ribbons, and similar materials, which comprises extruding a solution of cellulose acetate in acetone through a suitable shaping device into an aqueous coagulating medium containing 45-55% of a neutral organic solvent for the cellulose acetate which is less volatile than water and 1-10% of an acid salt selected from the group consisting of the bisulphates of sodium, potassium and ammonia, and stretching the products.

13. Process for the treatment of artificial filaments, threads, yarns, ribbons, and similar materials having a basis of cellulose acetate, which comprises softening such materials by treating them with an aqueous solution containing 45-55% of a neutral organic solvent for the cellulose acetate and 1-10% of an acid salt selected from the group consisting of the bisulphates of sodium, potassium and ammonia, and subjecting the softened materials to a stretching operation.

HENRY DREYFUS.